US007810516B2

(12) United States Patent
Gerken

(10) Patent No.: US 7,810,516 B2
(45) Date of Patent: Oct. 12, 2010

(54) CONTROL OF FLUID CONDITIONS IN BULK FLUID DISTRIBUTION SYSTEMS

(75) Inventor: David Gerken, Chaska, MN (US)

(73) Assignee: Air Liquide Electronics U.S. LP, Dallas, TX (US)

( * ) Notice: Subject to any disclaimer, the term of this patent is extended or adjusted under 35 U.S.C. 154(b) by 1057 days.

(21) Appl. No.: 11/367,140

(22) Filed: Mar. 3, 2006

(65) Prior Publication Data

US 2006/0196884 A1 Sep. 7, 2006

Related U.S. Application Data

(60) Provisional application No. 60/659,047, filed on Mar. 4, 2005.

(51) Int. Cl.
*G05D 11/00* (2006.01)

(52) U.S. Cl. ..................... 137/113; 137/87.02; 137/209

(58) Field of Classification Search ................. 137/205, 137/209, 87.02, 113, 208
See application file for complete search history.

(56) References Cited

U.S. PATENT DOCUMENTS 4,859,375 A * 8/1989 Lipisko et al. .............. 137/209

(Continued)

FOREIGN PATENT DOCUMENTS

WO WO 2007 117967 10/2007

OTHER PUBLICATIONS

PCT Notification of Transmittal of the International Search Report and the Written Opinion of the International Searching Authority, or the Declaration of International Application No. PCT/US 06/07928; Date of mailing: Aug. 14, 2007.

(Continued)

*Primary Examiner*—Stephen Hepperle
*Assistant Examiner*—Craig Price
(74) *Attorney, Agent, or Firm*—Patricia E. McQueeney

(57) ABSTRACT

An improved bulk fluid distribution for supplying process fluids to semiconductor process tools. The improved system having an alternating pressure vessel engine substantially eliminates pressure fluctuations in the bulk fluid supply line due to head losses from the changing weight of the fluid in the dispensing vessels. The system also enables flexible control of the flow conditions of the fluid in the fluid supply line.

21 Claims, 6 Drawing Sheets

U.S. PATENT DOCUMENTS

| | | | | |
|---|---|---|---|---|
| 5,148,945 | A * | 9/1992 | Geatz | 137/205 |
| 5,330,072 | A | 7/1994 | Ferri, Jr. et al. | |
| 5,370,269 | A | 12/1994 | Bernosky et al. | |
| 5,383,574 | A * | 1/1995 | Raphael | 137/205 |
| 5,417,346 | A * | 5/1995 | Ferri et al. | 137/205 |
| 5,490,611 | A | 2/1996 | Bernosky et al. | |
| 5,522,660 | A | 6/1996 | O'Dougherty et al. | |
| 5,632,866 | A | 5/1997 | Grant | |
| 5,632,960 | A | 5/1997 | Ferri, Jr. et al. | |
| 5,636,762 | A * | 6/1997 | Juhola et al. | 137/205 |
| 5,653,533 | A * | 8/1997 | Green | 137/209 |
| 5,803,599 | A | 9/1998 | Ferri, Jr. et al. | |
| 5,871,028 | A * | 2/1999 | Liu | 137/209 |
| 5,924,794 | A | 7/1999 | O'Dougherty et al. | |
| 6,006,777 | A * | 12/1999 | Renslow | 137/205 |
| 6,019,250 | A | 2/2000 | Pozniak et al. | |
| 6,098,843 | A | 8/2000 | Soberanis et al. | |
| 6,260,588 | B1 | 7/2001 | Noah et al. | |
| 6,269,975 | B2 | 8/2001 | Soberanis et al. | |
| 6,340,098 | B2 | 1/2002 | Soberanis et al. | |
| 6,604,555 | B2 * | 8/2003 | Blatt et al. | 137/209 |
| 6,675,987 | B2 | 1/2004 | Soberanis et al. | |
| 6,796,703 | B2 | 9/2004 | Lemke | |
| 7,334,595 | B2 * | 2/2008 | Birtcher et al. | 137/209 |
| 2006/0196541 | A1 * | 9/2006 | Gerken et al. | 137/209 |

OTHER PUBLICATIONS

PCT International Search Report of International Application No. PCT/US 06/07928; Date of mailing of the International Search Report: Aug. 14, 2007.

PCT Written Opinion of the International Searching Authority of International Application No. PCT/US 06/07928; Date of mailing: Aug. 14, 2007.

Australian Search Report for Singapore Patent Application No. 200706379-5.

International Preliminary Report on Patentability and Written Opinion for PCT/US2006/007928.

* cited by examiner

CONTROL OF FLUID CONDITIONS IN BULK FLUID DISTRIBUTION SYSTEMS

FIELD OF THE INVENTION

The present invention relates to an apparatus and method for controlling the pressure of a fluid in a bulk fluid distribution system. More particularly, the present invention provides improved apparatus and methods for controlling pressure of semiconductor process fluids (e.g. ultra-high purity or slurry fluids) in a bulk fluid supply line that supplies process tools used in semiconductor manufacturing or other related applications.

BACKGROUND OF THE INVENTION

The manufacture of semiconductor devices is a complex process that often requires over 200 process steps. Each step requires an optimal set of conditions to produce a high yield of semiconductor devices. Many of these process steps require the use of fluids to, inter alia, etch, expose, coat, and polish the surfaces of the devices during manufacturing. In high purity fluid applications, the fluids must be substantially free of particulate and metal contaminants in order to prevent defects in the finished devices. In chemical-mechanical polishing slurry applications, the fluids must be free from large particles capable of scratching the surfaces of the devices. Moreover, during manufacturing there must be a stable and sufficient supply of the fluids to the process tools carrying out the various steps in order to avoid process fluctuations and manufacturing downtime.

Since their introduction to the semiconductor market in the 1990s, bulk fluid distribution systems having vacuum-pressure engines have played an important role in semiconductor manufacturing processes. Because these systems are substantially constructed of inert wetted materials, such as perfluoroalkoxy (PFA) and polytetrafluoroethylene (PTFE), and because they use an inert pressurized gas as the motive force for supplying the fluids, they do not substantially contribute to particulate and metal contamination of the process fluids. In addition, a single bulk fluid distribution system can provide a continuous supply of process fluid at a sufficient pressure to multiple process tools. Thus, the advent of vacuum-pressure fluid distribution systems served an important need in the semiconductor market.

For many reasons, bulk fluid distribution systems (e.g. o-ring failures, valve failures, or contaminated incoming fluid) include filters in the fluid supply line. However, an abrupt change in the flow rate of the fluid through the filters causes hydraulic shock to the filters which results in a release of previously filtered particles into the fluid thereby causing a spike in the particle concentration. Although maintaining a minimum flow rate of the fluid through the filters helps reduce particulate release, the problem is not eliminated. Accordingly, pressure and flow fluctuations of the fluid can result in fluctuations of the particle concentration in the fluid, which may lead to defects in the semiconductor wafers.

Moreover, as discussed above, fluid distribution systems often supply many tools. When a tool demands process fluid, the fluid is pumped from the supply line which causes the pressure of the fluid in the supply line to drop by about 5 to about 25 psi. As will be discussed further below, typical fluid distribution systems having vacuum-pressure engines cause pressure fluctuations in the supply line which may adversely affect the flow and purity conditions of the fluid supplied to the tools. Accordingly, there is a need for a fluid distribution system that minimizes or eliminates pressure and flow fluctuations of the fluid in the supply line.

FIG. 1*a* depicts a standard vacuum-pressure fluid distribution system used to supply process fluids to semiconductor process tools. Other types of vacuum-pressure fluid distribution systems are described in U.S. Pat. Nos. 5,330,072 and 6,019,250, which are incorporated herein by reference.

With reference to FIG. 1*a*, a vacuum-pressure fluid distribution system typically includes two pressure-vacuum vessels 101 and 103. Each vessel is equipped with at least two fluid level sensors 105, 107, 109 and 111 (e.g. capacitive sensors). Sensors 105 and 109 monitor a low fluid level condition in vessels 101 and 103, respectively; and sensors 107 and 111 monitor a high-fluid level condition in vessels 101 and 103, respectively. The process fluid from fluid source 113 enters vessel 101 through two-way valve 115 and enters vessel 103 through two-way valve 117. The fluid exits vessel 101 through two-way valve 119 and exits vessel 103 through two-way valve 121. Upon exiting vessel 101 or vessel 103, the fluid flows through the bulk process fluid supply line 123.

During a fill cycle, a vacuum-generating device 125 (e.g. an aspirator or venturi) creates a vacuum in vessel 101 to draw in the fluid. When the fluid flows into vessel 101 during a fill cycle, two-way valves 115 and 127 are open and three-way valve 129 is in position “A”. When the vacuum is operated on vessel 101, any gas in vessel 101 flows to an exhaust (not shown) as the fluid from the fluid source 113 is drawn into the vessel. When the fluid reaches level sensor 107 (e.g. a capacitive sensor), valves 115, 127 and 129 deactivate and the vacuum stops.

During a dispense cycle, an inert gas 131, such as nitrogen, flows through “slave” regulator 133 and through position “B” of three-way valve 129 into vessel 101. Vessel 101 is initially pressurized to a predetermined value and then valve 119 opens allowing the fluid to flow under the force of the inert gas pressure through valve 119, through the filters (not shown) and into the bulk fluid supply line 123. The vessel 101 dispenses the fluid until it reaches low level sensor 105 at which point valve 119 closes and the fill cycle begins again.

During operation, vessels 101 and 103 alternate between fill and dispense cycles such that when vessel 101 is filling, vessel 103 is dispensing. During a fill cycle in vessel 103, valves 117 and 127 are open and valve 137 is in position “A”. During a dispense cycle in vessel 103, inert gas 131 flows through slave regulator 135 and port “B” of valve 137 to pressurize the fluid in vessel 103 and drive it through valve 121 to supply line 123. At the end of a dispense cycle in vessel 103, the vessels switchover so that vessel 103 begins a fill cycle and vessel 101 begins a dispense cycle. Notably, the vacuum-generating device 125 is configured so that the vessels fill faster than they dispense to provide a continuous flow of fluid to the supply line 123.

In the system shown in FIG. 1*a*, a manually-adjustable master regulator 141 is facilitated with a gas, such as compressed dry air, from a high pressure gas source 139. The master regulator 137 sends a constant gas pilot signal to both slave regulators 133 and 135 which thus provide a constant inert gas pressure to valves 129 and 137, respectively. The pressure supplied to each valve 129 and 127 is the same. Accordingly, during a dispense cycle of either vessel 101 or 103, the inert gas pressure supplied to each vessel is constant and the same.

A problem with the system of FIG. 1*a* is that it does not maintain a stable pressure of the fluid in the supply line 123. FIG. 1*b* shows a simplified illustration of how the pressure of the fluid in supply line 123 fluctuates over time. Losses due to process tool demands, fittings, piping and other parts present in a complex fluid distribution system were not accounted for in this illustration. During operation of system 100, as a vessel dispenses from its high sensor to its low sensor, the pressure in the supply line 123 decreases by an amount equivalent to the loss of the head pressure of the fluid between the high and low sensors. The head pressure is defined as the pressure resulting from the weight of the fluid in the vessel acting on the fluid in the supply line. When the vessels switchover the vessel beginning its dispense cycle starts full with fluid up to its high sensor, and the same pressure that was applied to the vessel that just completed its dispense cycle, is applied to the dispensing vessel. Thus, when the vessels switchover the pressure of the fluid in the supply line spikes or increases by an amount equivalent to the head pressure of the newly dispensing vessel.

There have been efforts to improve the system of FIG. 1*a* by actively controlling the pressure of the fluid in the supply line. FIG. 2*a* shows a modified vacuum-pressure system 200. System 200 is substantially similar to system 100 except that an electro-pneumatic master regulator 241 is used instead of manually-adjustable regulator 141. As in system 100, the electro-pneumatic master regulator 241 of system 200 is facilitated with a gas, such as compressed dry air, from a high pressure gas source 239. The system of FIG. 2*a* also includes a sensor 245 to monitor the pressure at a mid-point in the supply line 223. Like the system of FIG. 1*a*, vessels 201 and 203 alternate between vacuum fill and pressure dispense cycles, and master regulator 241 provides the same pneumatic signal to both slave regulators 233 and 235.

During a dispense cycle, the inert gas pressure applied to the fluid in the dispensing vessel 201 or 203 is adjusted based upon a signal from the pressure indicator 245. Considering a simplified fluid distribution system with no process tool demands or other pressure losses, the inert gas pressure supplied to the dispensing vessel 201 or 203 while it is dispensing increases to compensate for the loss in head pressure between the high and low sensors (207, 211 and 205, 209, respectively) of the vessel.

Although system 200 prevents a pressure decrease due to head loss in the dispensing vessel, it does not provide stable pressure control of the fluid in the supply line 223. FIG. 2*b* is an illustration of how the pressure in supply line 223 can fluctuate over time in a distribution system free from process tool demands or other pressure losses. During operation, when the vessels switchover the master regulator 241 continues to send the same signal (or pressure requirement) to the vessel beginning its dispense cycle as it was sending to the vessel that just completed its dispense cycle. Accordingly, when the vessels switchover there is a spike in the pressure in the supply line 223 equivalent to the change in head pressure between the high and low sensors of the vessel that just completed its dispense cycle. As a result, the system 200 actively attempts to decrease the pressure of the fluid in the supply line 223 and continues to adjust the pressure until it reaches a predetermined setpoint. Thus, a problem with the system 200 is that the pressure of the fluid in the supply line 223 oscillates until it reaches a steady state as shown in FIG. 2*b*.

In addition, another problem with system 200 is that it continually adjusts the pneumatic signal to the slave regulator of the non-dispensing or standby vessel. Thus, the slave regulator for the non-dispensing vessel incurs significant wear and tear on the slave regulator of the standby vessel.

Accordingly, there remains a need in the semiconductor industry for improvements to fluid distribution systems including providing stable control of the flow conditions of the process fluid without causing wear and tear on the component parts.

BRIEF SUMMARY OF THE INVENTION

A method for controlling the pressure of a fluid in a bulk fluid distribution system comprising alternately dispensing fluid from a first vessel and a second vessel to at least one point of use under conditions wherein the pressure of the fluid at the at least one point of use remains substantially constant.

A method for controlling the pressure of a fluid in a bulk fluid distribution system having a first vessel and a second vessel for supplying the fluid to a supply line, an inert gas source for supplying an inert gas to the first and second vessels, a controller and a sensor positioned in the supply line comprising the steps of: receiving at the controller a control signal from the sensor; initiating a dispense cycle of the first vessel comprising the steps of: determining a first signal from the control signal and a head pressure of the fluid between a first level and a second level of the second vessel; applying a first pressure to the fluid in the first vessel based upon the first signal; and dispensing the fluid from a first level to a second level of the first vessel; and initiating a dispense cycle of the second vessel comprising the steps of: determining a second signal from the control signal and a head pressure between the first level and the second level of the first vessel; applying a second pressure to the fluid in the second vessel based upon the second signal; and dispensing the fluid from the first level to the second level of the second vessel.

An apparatus for controlling the pressure of a fluid in an alternating vessel bulk fluid distribution system comprising: a first vessel having a first pair of sensors for detecting a first level and a second level of the fluid in the first vessel; a second vessel having a second pair of sensors for detecting a first level and a second level of the fluid in the second vessel; an inert gas feed line for supplying an inert gas to the vessels; a first pair of regulators including a first master regulator and a first slave regulator wherein the first slave regulator is adapted to regulate the pressure of the inert gas to the first vessel; a second pair of regulators including a second master regulator and a second slave regulator wherein the second slave regulator is adapted to regulate the pressure of the inert gas to the second vessel; a fluid supply line having a control sensor positioned within the supply line wherein the vessels are adapted to alternately dispense fluid to the supply line; and a controller adapted to receive a control signal from the control sensor, determine a first signal based upon the control signal and a change in head pressure of the fluid between the first and second levels of the second vessel, determine a second signal based upon the control signal and a change in head pressure of the fluid between the first and second levels of the first vessel, and send the first signal to the first master regulator and the second signal to the second master regulator.

DETAILED DESCRIPTION OF THE INVENTION

Figure 1A:
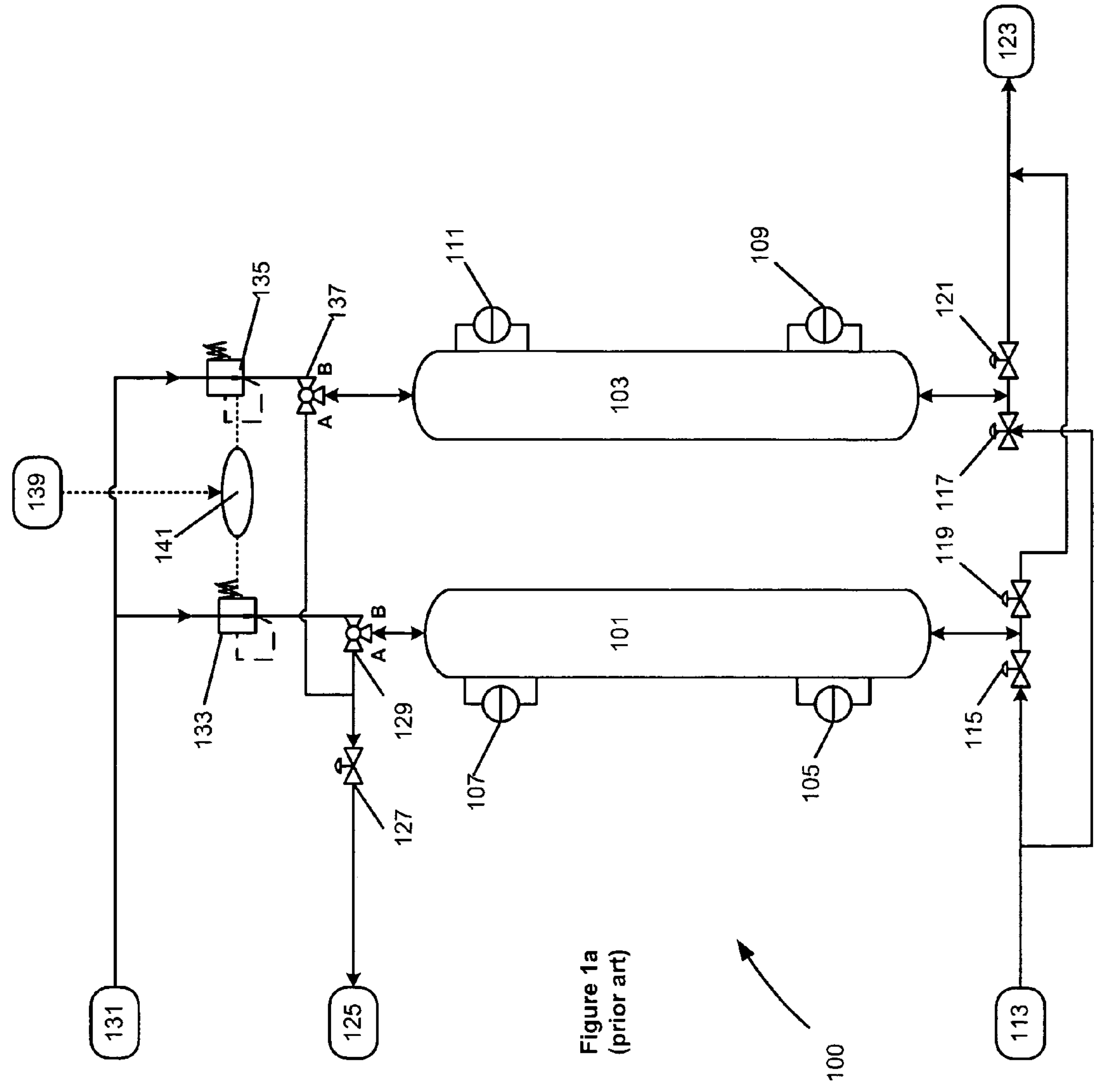
Figure 1a (prior art)
FIG. 1*a* is a schematic representation of a prior art vacuum-pressure fluid distribution system.
Figure 1B:
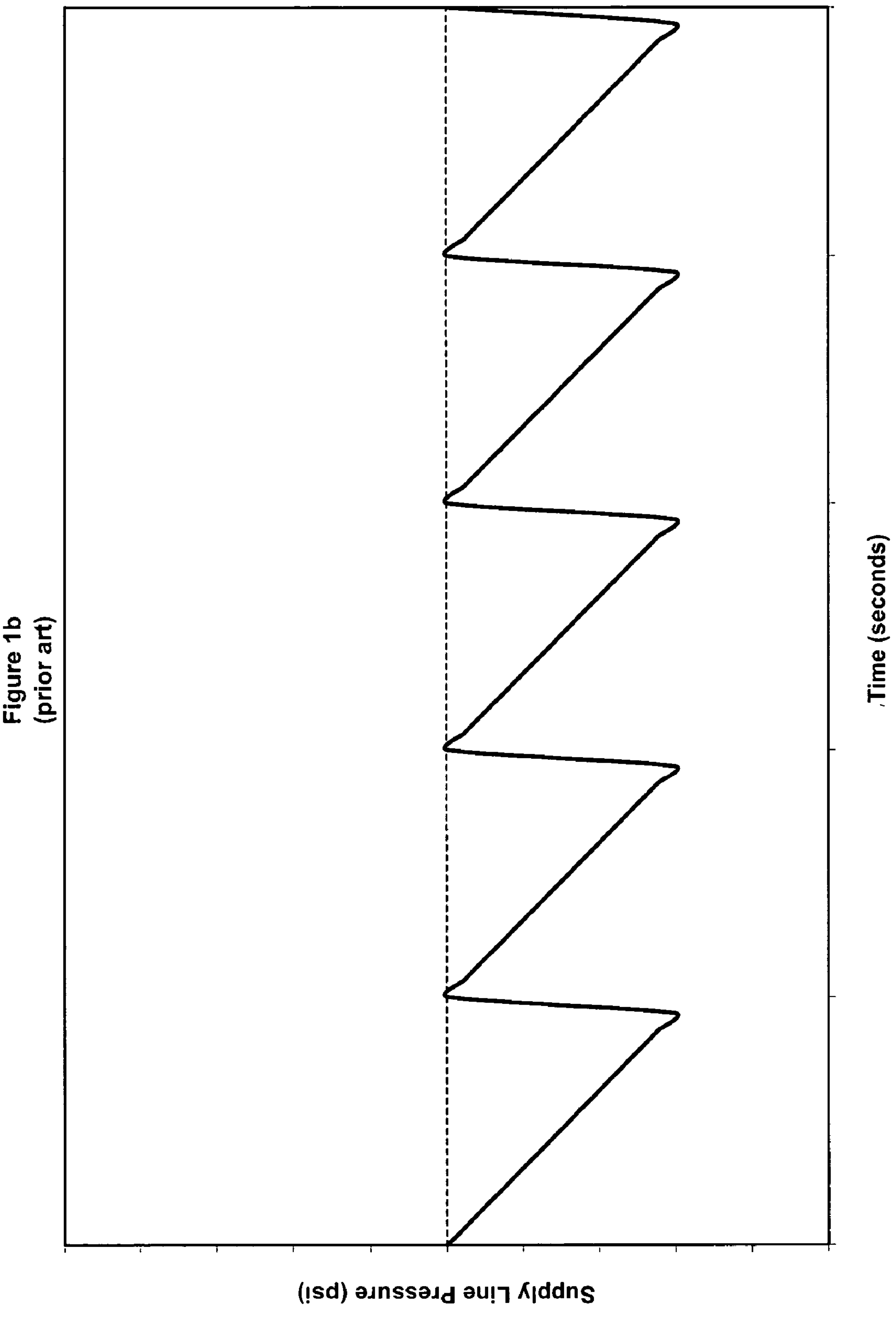
Figure 1b (prior art)
FIG. 1*b* is an illustration of the pressure fluctuations of the fluid in the supply line of the prior art fluid distribution system of FIG. 1*a*.
Figure 2A:
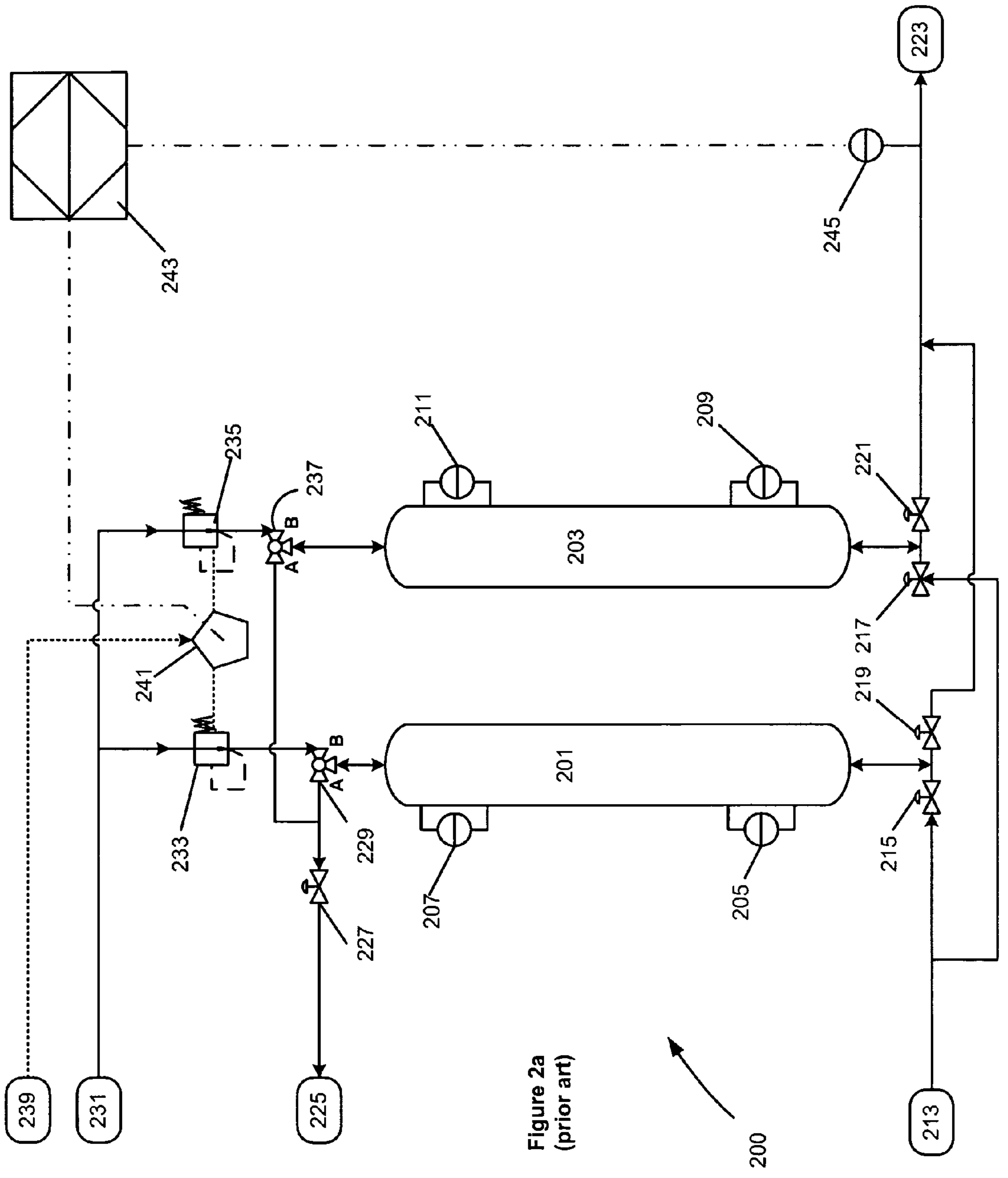
Figure 2a (prior art)
FIG. 2*a* is a schematic representation of a prior art fluid distribution system.
Figure 2B:
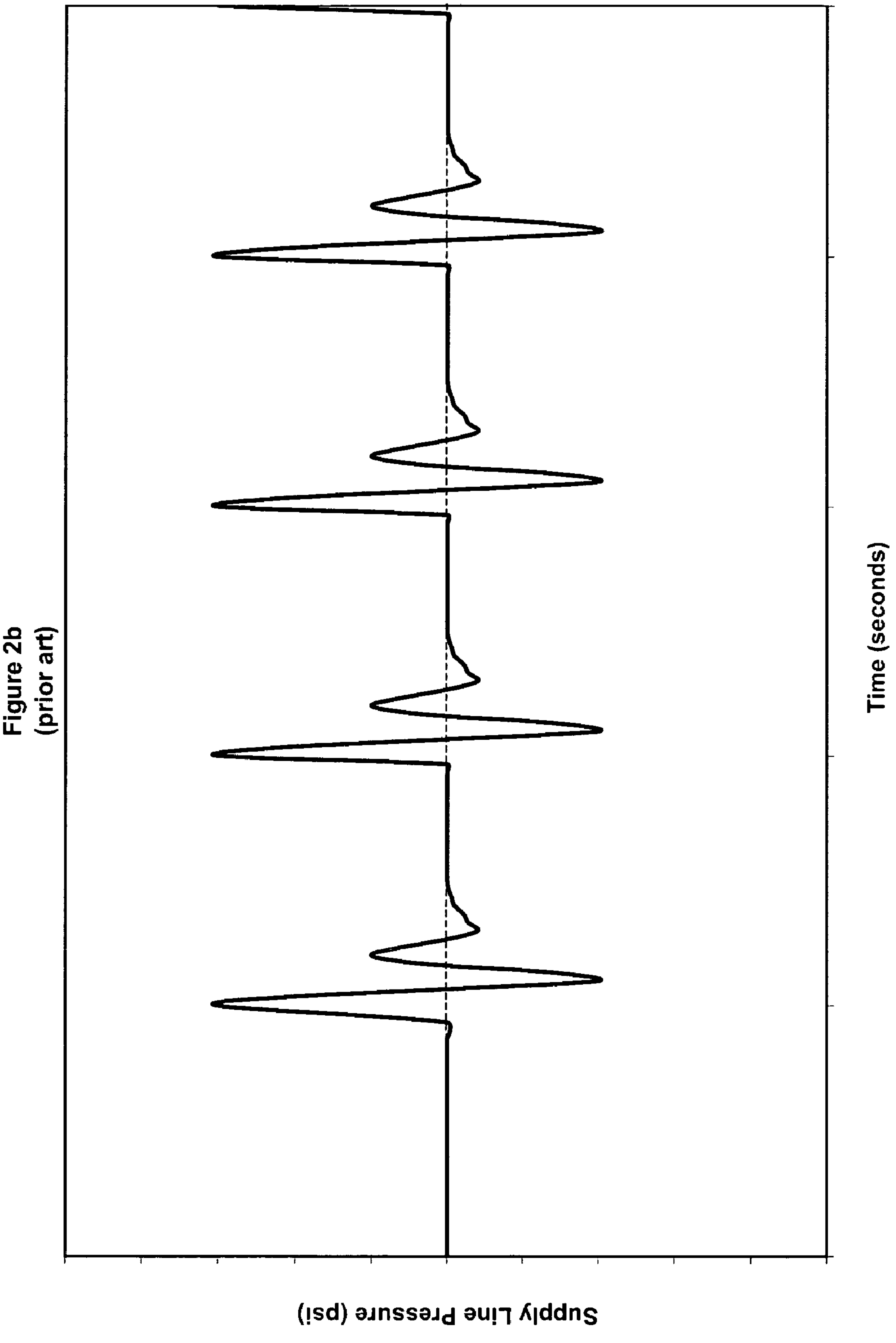
Figure 2b (prior art)
FIG. 2*b* is a illustration of the pressure fluctuations of the fluid in the supply line of the prior art fluid distribution system of FIG. 2*a*.
Figure 3A:
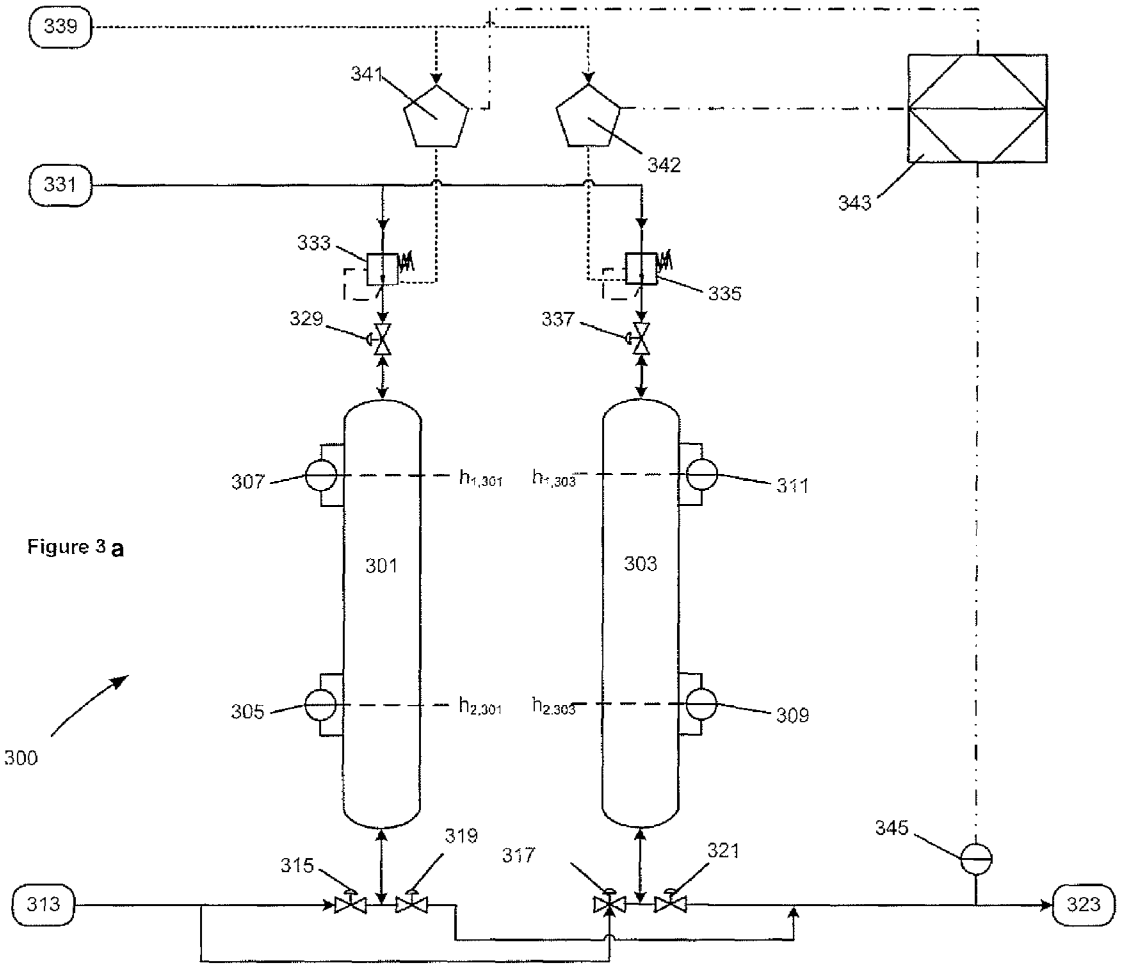
FIG. 3*a* is a schematic representation of a fluid distribution system according to the present invention.
Figure 3B:
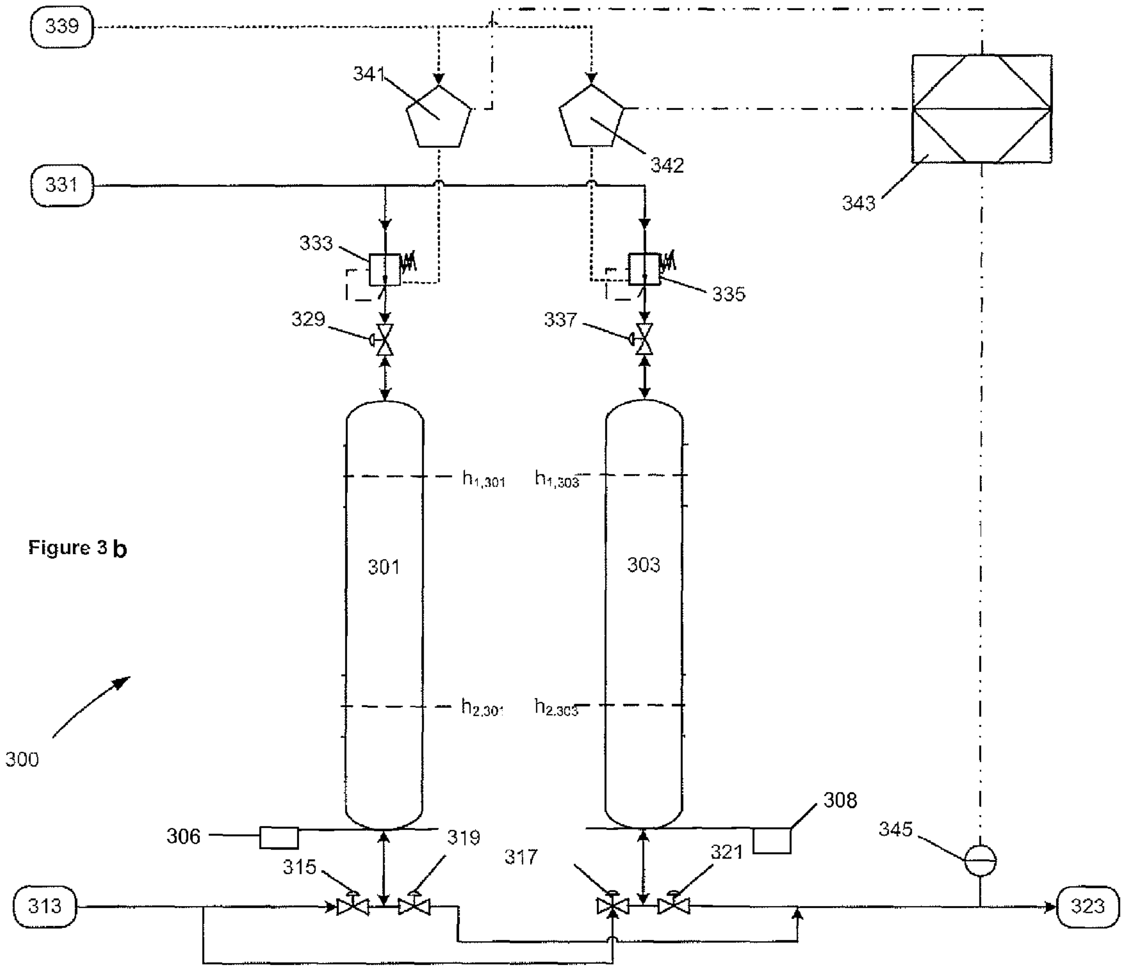
FIG. 3*b* is a schematic representation of an alternate embodiment of the fluid distribution system according to the present invention.

Two embodiments of the present invention are shown in FIGS. 3*a* and 3*b*. The invention is directed to a vacuum-pressure fluid distribution system 300 that provides stable control of the pressure of a fluid in a bulk fluid supply line 323. The system 300 substantially eliminates all of the pressure fluctuations of the prior art systems shown in FIGS. 1 and 2.

System 300 has two vessels 301 and 303 each equipped with at least one fluid level sensing device (e.g. 305, 306, 307, 308, 309 and 311). While vacuum-pressure engines typically employ capacitive sensors as level sensing devices, the present invention additionally contemplates the use of optical sensors, digital sensors, load cells or the like. The system shown in FIG. 3*a* includes two sensors 305 and 309 for monitoring a low fluid level condition in vessels 301 and 303, respectively; and sensors 307 and 311 for monitoring a high-fluid level condition in vessels 301 and 303, respectively. The system shown in FIG. 3*b* includes two load cells 306 and 308 for monitoring the fluid levels in vessels 301 and 303, respectively. The fluid from fluid source 313 (e.g. a pump, another chemical distribution system, a pressurized drum or the like) enters vessel 301 through two-way valve 315 and enters vessel 303 through two-way valve 317. The fluid exits vessel 301 through two-way valve 319 and exits vessel 303 through two-way valve 321. Upon exiting vessel 301 or vessel 303, the fluid flows through a filter (not shown) and to the fluid supply line 323.

During a fill cycle, the vessels 301 and 303 can be filled under pressure or vacuum conditions. For example, a pump or the supply line from another fluid distribution system can provide a pressurized supply of the fluid to the vessels 301 and 303. If a pressurized source is used, then as a vessel is filling, a vent in the vessel (not shown) will open to exhaust residual gas from the vessel. In contrast, when the vessels are filled under vacuum conditions, a vacuum generating device (not shown in FIG. 3), such as an aspirator, will draw the fluid into the vessel as described above and as shown in FIGS. 1*a* and 2*a*.

During a fill cycle of vessel 301, valve 315 is open as fluid flows into the vessel. When the fluid reaches a predetermined high level, as indicated by either a level sensor 307 (e.g. capacitive, optical, digital, or the like) or by a load cell 306, valve 315 closes.

During a dispense cycle of vessel 301, an inert gas 331, such as nitrogen, flows through "slave" regulator 333 and valve 329 to pressurize vessel 301 to dispense fluid through valve 319 to supply line 323 until the fluid level in vessel 301 reaches a predetermined "low" level, as detected by a level sensor 305 (e.g. capacitive, optical, digital or the like) or a load cell 306, at which point valve 319 closes and the vacuum filling sequence begins.

During operation, vessels 301 and 303 alternate between fill and dispense cycles such that when vessel 301 is filling, vessel 303 is dispensing. During a dispense cycle in vessel 303, inert gas 331 flows through slave regulator 335 and valve 337 to pressurize vessel 303 to dispense fluid through valve 321 to supply line 323 until the fluid level in vessel 303 reaches a predetermined "low" level, as detected by a level sensor 309 or a load cell 308, at which point valve 321 closes and the vacuum filling sequence begins. Notably, the system is configured so that the vessels fill faster than they dispense in order to provide a continuous flow of fluid to the supply line 323.

System 300 uses sensor 345 (e.g. a pressure transducer, flow meter or the like) to monitor a condition of the fluid in the supply line 323 and the system adjusts the inert gas pressure supplied to the vessels to compensate for changes in the condition of the fluid in the supply line 323. The sensor 345 can be positioned at any point in the supply line 323, but is preferably positioned at a mid-point in the supply line 323. In addition, system 300 substantially eliminates any changes in the pressure of the fluid in the supply line 323 resulting from changes in head pressure during dispense cycles of the vessels.

System 300 includes a controller 343 which receives a control signal from sensor 345. The controller is connected to master regulators 341 and 342 (e.g. electro-pneumatic regulators), which control slave regulators 333 and 335 (e.g. dome loaded pressure regulators), respectively. Master regulators 341 and 342 are facilitated with gas from a high-pressure gas source 339. The sensor 345 and master regulators 341 and 342 may be connected to the controller 343 by analog cables, digital cables (e.g. Ethernet cables), or wireless connections. The slave regulators 333 and 335 control the pressure of inert gas supplied to each vessel 301 and 303, respectively.

To eliminate pressure fluctuations of the fluid in the supply line 323 resulting from changes in head pressure in the vessels during dispense cycles, the controller biases the signal sent to each vessel at the beginning of a dispense cycle. The following example illustrates the operation of the invention to eliminate fluctuations due to changes in the head pressures.

Example 1

Assume Vessel 301 has completed a fill cycle by filling the vessel with fluid to its high level (307 as shown in FIG. 3*a*) and is standing by while vessel 303 completes its dispense cycle by dispensing fluid to its low level (309 as shown in FIG. 3*a*).

During the dispense cycle of vessel 303, the controller 343 is periodically or continuously receiving a signal from sensor 345 and adjusting the inert gas pressure supplied to vessel 303 to maintain a predetermined flow condition (e.g. pressure, flow rate or the like) in the supply line 323. As vessel 303 dispenses from its high level (311 as shown in FIG. 3*a*) to its low level (309 as shown in FIG. 3*a*) the head pressure of the fluid decreases between level $h_{1,303}$ and level $h_{2,303}$ in accordance with the following equation for the change in head pressure of a fluid in a vessel: $\Delta P_{303}=P_{1,303}-P_{2,303}=\rho g(h_{1,303}-h_{2,303})$ (where p=density of the fluid and g=9.8 m/s$^2$).

Consequently, to prevent a decrease in the pressure of the fluid in the supply line 323, the controller 343 sends a signal (e.g. a 4-20 mA signal) to master regulator 342 to increase the inert gas pressure, controlled by slave regulator 335, to the vessel 303. Notably, the sensor 345 may detect other changes in the pressure due to tool demands or pressure losses through the pipes and fittings in the fluid distribution system, but for the purposes of this example, these losses will not be considered. When the fluid in vessel 303 reaches the low level, the vessels switchover and vessel 301 begins a dispense cycle while vessel 303 begins a fill cycle.

While vessel 303 is dispensing, the controller is independently determining or calculating a first signal to be sent to the regulators controlling the inert gas pressure to vessel 301 when it begins its dispense cycle. In this example, the controller monitors the control signal sent by sensor 345 and determines the first signal by reducing the control signal by an amount correlating to the change in head pressure of vessel 303. Thus, when vessel 301 begins its dispense cycle, the inert gas pressure applied to the fluid in vessel 301 is reduced by an amount equivalent to the change in head pressure of the fluid in vessel 303. Without this reduction, the pressure applied to the vessel would be too high and cause the pressure in the supply line 323 to spike.

After the beginning of its dispense cycle, the controller 343 adjusts the inert gas pressure supplied to vessel 301 in the same manner as described above with respect to vessel 303 in order to maintain the predetermined flow condition of the fluid in the supply line 323.

The system 300 of the present invention provides improved pressure control of the process fluid over the prior art systems 100 and 200. Indeed, depending on the placement of the sensors, (i.e. the vertical distance between them), the invention may provide pressure control of the fluid in the supply line to about ±0.2 psi to about ±1.5 psi of a predetermined setpoint with continuous adjustment to maintain steady state conditions whereas system 200 at best offered control from 1.5 to 3 psi of a predetermined setpoint.

Another advantage of the present invention is that the pair of regulators 333,341 and 335,342 can be independently controlled. This enables more flexibility in the control process and reduces wear and tear on the slave regulators so that the slave regulator for the non-dispensing vessel does not have to continually adjust.

In addition, as noted above, the system 300 can compensate for other pressure or flow condition changes (monitored by sensor 345) resulting from inter alia changes in tool demand, pressure losses across filters, and frictional losses from piping and other system components. Thus, the system 300 of the present invention offers much more stable control of flow conditions of the fluid supplied to points of use than other prior art systems.

It is anticipated that other embodiments and variations of the present invention will become readily apparent to the skilled artisan in light of the and variations likewise be included within the scope of the invention as set forth in the following claims.

I claim:

1. A method for controlling the pressure of a fluid in a bulk fluid distribution system having a first vessel and a second vessel for supplying the fluid to a supply line, an inert gas source for supplying an inert gas to the first and second vessels, a controller and a sensor positioned in the supply line comprising the steps of:

receiving at the controller a control signal from the sensor;

initiating a dispense cycle of the first vessel comprising the steps of:

determining a first signal from the control signal and a change in head pressure of the fluid between a first level and a second level of the second vessel; applying a first pressure to the fluid in the first vessel based upon the first signal; and dispensing the fluid from a first level to a second level of the first vessel; and initiating a dispense cycle of the second vessel comprising the steps of:

determining a second signal from the control signal and a change in head pressure between the first level and the second level of the first vessel; applying a second pressure to the fluid in the second vessel based upon the second signal; and dispensing the fluid from the first level to the second level of the second vessel.

2. The method of claim 1 wherein the controller controls the dispense cycle of the first vessel independently from the dispense cycle of the second vessel.

3. The method of claim 1 wherein the step of dispensing the fluid from the first vessel includes adjusting the inert gas pressure applied to the fluid in the first vessel in response to the control signal to maintain a predetermined pressure in the supply line.

4. The method of claim 1 wherein the step of dispensing the fluid from the second vessel includes adjusting the inert gas pressure applied to the fluid in the second vessel in response to the control signal to maintain a predetermined pressure in the supply line.

5. The method of claim 1 further comprising the step of filling the first vessel from a fluid source after the step of dispensing the fluid to the second level of the first vessel and during the step of dispensing the fluid from the second vessel.

6. The method of claim 5 wherein the fluid source supplies a pressurized fluid.

7. The method of claim 5 wherein the step of filling the first vessel includes creating a vacuum in the first vessel to withdraw the fluid from the fluid source.

8. The method of claim 1 further comprising the step of filling the second vessel from a fluid source after the step of dispensing the fluid to the second level of the second vessel and during the step of dispensing the fluid from the first vessel.

9. The method of claim 8 wherein the fluid source supplies a pressurized fluid.

10. The method of claim 8 wherein the step of filling the second vessel includes creating a vacuum in the second vessel to withdraw the fluid from the fluid source.

11. The method of claim 1 wherein the control signal corresponds to the pressure of the fluid in the supply line.

12. The method of claim 1 wherein the control signal corresponds to the flow rate of the fluid in the supply line.

13. The method of claim 1 wherein the fluid is selected from the group of semiconductor process fluids consisting of acids, bases, solvents and chemical-mechanical polishing slurries.

14. The method of claim 1 further comprising the step of detecting the first level and the second level of the fluid in the first vessel with capacitive, optical or digital sensors.

15. The method of claim 1 further comprising the step of detecting the first level and the second level of the fluid in the first vessel with load cells.

16. The method of claim 1 further comprising the step of detecting the first level and the second level of the fluid in the second vessel with capacitive, optical or digital sensors.

17. The method of claim 1 further comprising the step of detecting the first level and the second level of the fluid in the second vessel with load cells.

18. A method for controlling the pressure of a fluid in a bulk fluid distribution system having a first vessel and a second vessel for supplying the fluid to a supply line, an inert gas source for supplying an inert gas to the first and second vessels, a controller and a sensor positioned in the supply line comprising the steps of:

applying the inert gas to the fluid at a first level in the first vessel;

dispensing the fluid in the first vessel from the first level to a second level of the first vessel;

adjusting the inert gas pressure to the first vessel in response to a signal from the sensor in the supply line in order to maintain a predetermined fluid pressure in the supply line;

applying the inert gas to the fluid at a first level in the second vessel;

dispensing the fluid in the second vessel from the first level to a second level of the second vessel; and adjusting the inert gas pressure to the second vessel in response to a signal from the sensor in the supply line in order to maintain a predetermined pressure in the supply line;

wherein the inert gas pressure supplied to the fluid at the first level of the first vessel is adjusted for a change in head pressure between the first and second levels of the second vessel and wherein the inert gas pressure supplied to the first level of the second vessel is adjusted for a head pressure between the first and second levels of the first vessel.

19. A method for controlling the pressure of a fluid in a bulk fluid distribution system having a supply line, a first vessel and a second vessel for supplying the fluid to the supply line, an inert gas source for supplying an inert gas to the first and second vessels, a controller and a sensor positioned in the supply line comprising the steps of:

sending a control signal from the sensor to the controller;

determining a first signal from the control signal and a change in the head pressure of the fluid between a first level and a second level of the second vessel;

applying a first inert gas pressure to the first vessel based upon the first signal;

dispensing the fluid from the first vessel to the supply line and;

determining a second signal from the control signal and a change in the head pressure of the fluid between a first level and a second level of the first vessel;

applying a second inert gas pressure to the second vessel based upon the second signal; and dispensing the fluid from the second vessel to the supply line.

20. The method of claim 19 wherein the step of dispensing the fluid from the first vessel includes adjusting the inert gas pressure to the first vessel in response to the control signal to maintain a predetermined pressure in the supply line.

21. The method of claim 19 wherein the step of dispensing the fluid from the second vessel includes adjusting the inert gas pressure to the second vessel in response to the control signal to maintain a predetermined pressure in the supply line.

* * * * *